(12) United States Patent
Busardo (10) Patent No.: US 7,031,453 B1
(45) Date of Patent: Apr. 18, 2006

(54) TELEPHONY RING CUSTOMIZATION

(75) Inventor: Philip J. Busardo, Rochester, NY (US)

(73) Assignee: Nortel Networks Limited, St. Laurent (CA)

( * ) Notice: Subject to any disclaimer, the term of this patent is extended or adjusted under 35 U.S.C. 154(b) by 743 days.

(21) Appl. No.: 09/811,743

(22) Filed: Mar. 19, 2001

(51) Int. Cl.
*H04M 3/00* (2006.01)

(52) U.S. Cl. .......................... 379/373.02; 379/374.02; 379/373.04

(58) Field of Classification Search ........... 379/373.01, 379/373.03, 67.1, 76, 82, 88.07, 88.12, 88.21, 379/93.03, 93.15, 142.07, 373.02, 373.04, 379/374.02; 455/567, 466, 463, 415, 462; 375/15.01

See application file for complete search history.

(56) References Cited

U.S. PATENT DOCUMENTS

| | | | |
|---|---|---|---|
| 4,873,719 A | 10/1989 | Reese | 379/215 |
| 5,289,530 A | 2/1994 | Reese | 379/88 |
| 5,309,512 A | 5/1994 | Blackmon et al. | 379/210 |
| 5,526,406 A | 6/1996 | Luneau | 379/61 |
| 5,533,102 A | 7/1996 | Robinson et al. | 379/67 |
| 5,550,908 A | 8/1996 | Cai et al. | 379/215 |
| 5,619,561 A | 4/1997 | Reese | 379/142 |
| 5,636,269 A | 6/1997 | Eisdorfer | 379/215 |
| 5,651,054 A | 7/1997 | Dunn et al. | 379/67 |
| 5,805,587 A | 9/1998 | Norris et al. | 370/352 |
| 5,805,677 A | 9/1998 | Ferry et al. | 379/93.35 |
| 5,809,128 A | 9/1998 | McMullin | 379/215 |
| 5,825,867 A | 10/1998 | Epler et al. | 379/215 |
| 5,828,742 A | 10/1998 | Khalid et al. | 379/199 |
| 5,832,060 A | 11/1998 | Corlett et al. | 379/88 |
| 5,836,009 A | 11/1998 | Diamond et al. | 379/93.23 |
| 5,946,381 A | 8/1999 | Danne et al. | 379/142 |
| 5,999,599 A * | 12/1999 | Shaffer et al. | 379/142.01 |
| 5,999,613 A | 12/1999 | Nabkel et al. | 379/215 |
| 6,028,922 A | 2/2000 | Deutsch et al. | 379/211 |
| 6,078,581 A | 6/2000 | Shtivelman et al. | 370/352 |
| 6,104,800 A | 8/2000 | Benson | 379/215 |
| 6,134,320 A | 10/2000 | Swan et al. | 379/372 |
| 6,219,414 B1 | 4/2001 | Maciejewski et al. | 379/215 |
| 6,253,075 B1 | 6/2001 | Beghtol et al. | 455/415 |
| 6,269,159 B1 | 7/2001 | Cannon et al. | 379/202 |
| 6,308,221 B1 | 10/2001 | Perlman et al. | 709/241 |
| 6,317,488 B1 | 11/2001 | DePond et al. | 379/93.35 |
| 6,339,639 B1 | 1/2002 | Henderson | 379/142.08 |
| 6,343,121 B1 | 1/2002 | Infosino | 379/215.01 |
| 6,347,136 B1 | 2/2002 | Horan | 379/142.01 |

(Continued)

FOREIGN PATENT DOCUMENTS

JP 0048749 5/1981 ................. 379/215

(Continued)

*Primary Examiner*—Jefferey F. Harold
(74) *Attorney, Agent, or Firm*—Withrow & Terranova, PLLC (57) ABSTRACT

The present invention provides for customizing a telephony ring signal to correspond to the originator of an incoming call. Preferably, a user will access an application server using a browser to associate audio files with telephone numbers of people who are expected to call the user. The application server will create an association between the audio files and the telephone numbers and download indicia bearing on the association to the user's telephony device. Upon receiving an incoming call from a number associated with an audio file, the telephone will play the audio file as the ring signal.

14 Claims, 5 Drawing Sheets

U.S. PATENT DOCUMENTS

| | | | |
|---|---|---|---|
| 6,366,791 B1 * | 4/2002 | Lin et al. | 455/567 |
| 6,373,925 B1 * | 4/2002 | Guercio et al. | 379/82 |
| 6,389,124 B1 | 5/2002 | Schnarel et al. | 379/142.01 |
| 6,393,106 B1 | 5/2002 | Cannon et al. | 379/67.1 |
| 6,404,858 B1 | 6/2002 | Farris et al. | 379/88.02 |
| 6,434,394 B1 * | 8/2002 | Grundvig et al. | 455/463 |
| 6,445,694 B1 | 9/2002 | Swartz | 370/352 |
| 6,466,653 B1 * | 10/2002 | Hamrick et al. | 379/67.1 |
| 6,519,228 B1 * | 2/2003 | Creamer et al. | 379/15.01 |
| 6,714,637 B1 * | 3/2004 | Kredo | 379/142.08 |
| 6,766,004 B1 * | 7/2004 | Chiloyan | 379/142.15 |
| 2001/0043691 A1 | 11/2001 | Bull et al. | 379/142.08 |
| 2002/0094076 A1 * | 7/2002 | Chen | 379/373.01 |

FOREIGN PATENT DOCUMENTS

| | | | |
|---|---|---|---|
| JP | 0250256 | 10/1988 | 379/215 |
| JP | 0250257 | 10/1988 | 379/215 |
| JP | 0022162 | 1/1989 | 379/215 |
| JP | 0060137 | 3/1989 | 379/68 |
| JP | 0137859 | 5/1989 | 379/68 |
| JP | 0232862 | 9/1989 | 379/68 |
| JP | 0248747 | 10/1989 | 379/215 |
| JP | 0253389 | 10/1989 | 379/215 |
| JP | 0256358 | 10/1990 | 379/215 |
| SU | 0474115 | 6/1975 | 379/215 |

* cited by examiner

TELEPHONY RING CUSTOMIZATION

FIELD OF THE INVENTION

The present invention relates to communication telephony, and in particular, to customizing a telephony ring signal associated with an incoming call based on the origination of the call.

BACKGROUND OF THE INVENTION

Personalization and customization of electronics and communication devices is a continuing trend. Wireless telephone users can customize the color and graphics of their telephones' body and display. Further, most wireless telephones allow the user to select from a number of ring signals to alert the user of an incoming call. The ring signals may range from standard two-second ring tones separated by four seconds of silence, to playing a jingle or a portion of a song. Although most wireless telephones have available caller identification, there is no association between the incoming caller and the type of ring signal alerting the user to the incoming call. The ring signal configuration for these telephones is the same for all incoming calls.

Certain business and residential telephone configurations are capable of providing different ring signals to help determine the party to whom an incoming call is directed. This configuration is particularly useful when two or more people share a common telephone or telephone line. Although these telephones may have different ring signals to determine to whom the incoming call is directed, there is no association between the calling party and the ring signal provided by the telephone.

As with wireless telephones, most business and residential telephone services support caller identification (caller ID). Although these caller ID services may be customized to block incoming calls where the caller ID is not provided, there is little opportunity to customize these telephony services. With caller ID, the only way to determine the identity of a calling party is to view the telephone display providing the caller ID information. As such, viewing caller ID information poses a significant safety hazard when driving or participating in other activities.

Given the desire to customize communication devices and the inherent limitations of existing caller identification, there is a need to customize the ring signal provided by a telephone based on the calling party. There is a further need to provide an efficient and user-friendly way to provide and implement these customization services.

SUMMARY OF THE INVENTION

The present invention provides for customizing a telephony ring signal to correspond to the originator of an incoming call. Preferably, a user will access an application server using a browser to associate audio files with telephone numbers of people who are expected to call the user. The application server will create an association between the audio files and the telephone numbers and download indicia bearing on the association to the user's telephony device. Upon receiving an incoming call from a number associated with an audio file, the telephone will play the audio file as the ring signal.

The audio files may be downloaded to the telephone from any number of devices, including the application server, through any number of communication networks or directly through a telephone interface. As such, the information downloaded from the application server may or may not include the actual files, but will include the association of the identity of the audio files with the telephone numbers of expected callers. The ring signals may take on any audio configuration, from a variation on traditional ring signals to an actual announcement of the caller's name.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of the specification illustrate several aspects of the invention, and together with the description serve to explain the principles of the invention.

DETAILED DESCRIPTION OF THE PREFERRED EMBODIMENTS

The present invention provides for customizing a ring signal for a telephony device. Telephone numbers for potential callers are associated with select audio files. When an incoming call is processed, the telephony device will determine the incoming caller and execute an audio file as a ring signal based on the incoming caller. The present invention provides for web-based configuration wherein a subscriber to these customization services may easily and efficiently associate potential callers with any number of audio files and have the customization downloaded to the subscriber's telephone or telephone system. Upon reading the following description in light of the accompanying drawing figures, those skilled in the art will understand the concepts of the invention and will recognize applications of these concepts not particularly addressed herein. It should be understood that these concepts and applications fall within the scope of this disclosure and the accompanying claims.

Figure 1:
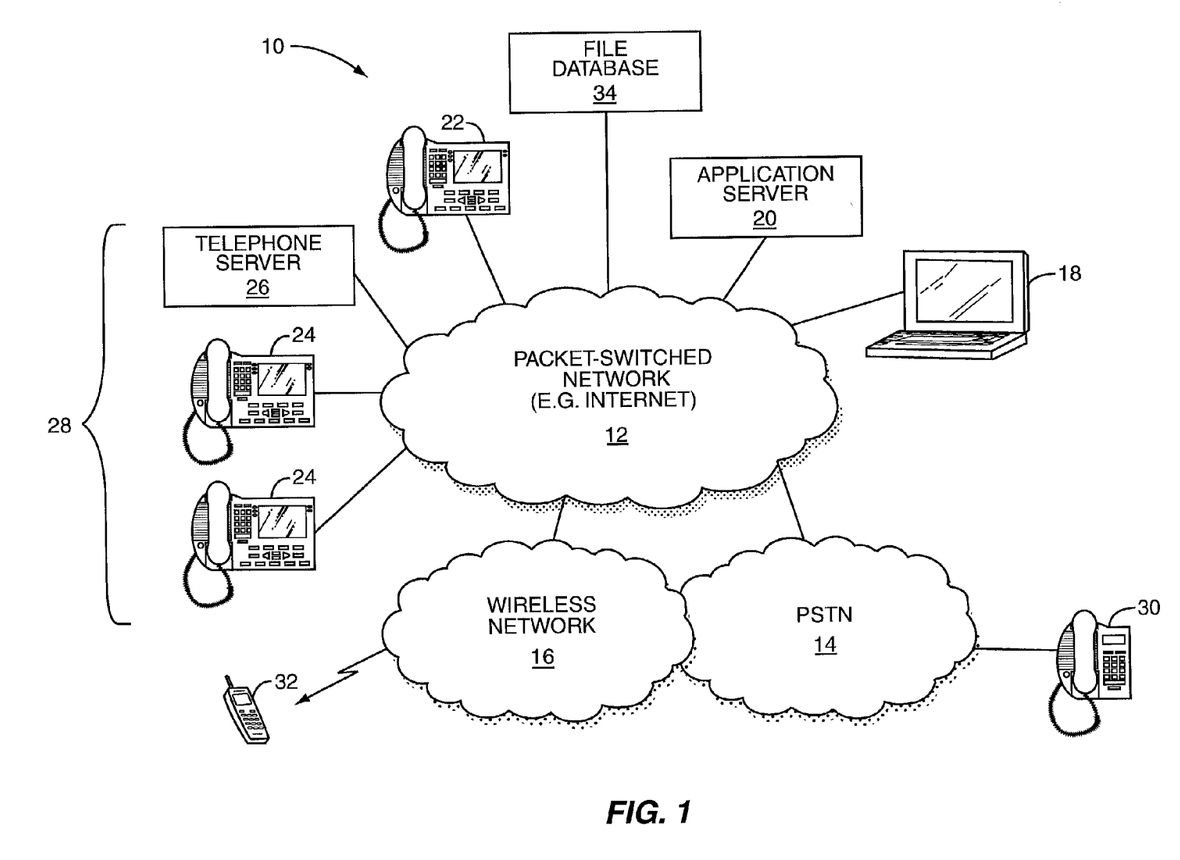
FIG. 1 depicts an exemplary communication environment capable of implementing the present invention.

The embodiments set forth below represent the necessary information to enable those skilled in the art to practice the invention and illustrate the best mode of practicing the invention. With reference to FIG. 1, a communication environment is illustrated and generally referenced as 10. The communication environment 10 may include a packet-switched network 12, such as the Internet, in association with a public switched telephone network (PSTN) 14 or a wireless network 16. The packet-switched network 12, PSTN 14, and wireless network 16 may interact and facilitate communications within and throughout the networks in traditional fashion.

Preferably, a subscriber to a customization service will use a web browser running on a computer 18 to access an application server 20 capable of allowing the subscriber to customize the telephone service as well as interact with her telephone to implement the customization. Operation of the application server 20 is provided in detail below. The subscriber's telephone may be any type of telephone including a stand-alone, packet-switched telephone 22, a packet-switched telephone terminal 24 acting as a client of the telephone server 26 to form a telephone network 28, a traditional circuit-switched telephone 30, or a mobile telephone 32.

The stand-alone telephone 22 and telephone terminals 24 communicate over the packet-switched network 12. The stand-alone telephone 22 is configured to act as a stand-alone device capable of operating without the services of an associated server. In contrast, the telephone terminals 24 are configured as clients of the telephone server 26 wherein the functionality of the telephone terminals 24 are substantially controlled by the telephone server 26.

For the purposes of the present invention, each of the telephones 22, 24, 30, 32 is capable of generating a ring signal for an incoming call from an identified audio file. The telephones 22, 24, 30, 32 may be configured to function independently or function in association with another device, as is the case with the packet-switched telephone server system 28. The telephones 22, 24, 30, 32 are preferably capable of independently, or in association with another device, recognizing the originator of an incoming call, selecting an audio file associated with the originator, and playing the audio file as the ring signal. The telephones 22, 24, 30 32, or the telephone server 26, preferably receive sufficient information to operate in this fashion by the application server 20. Typically, the application server 20 provides a browser interface for the subscriber to define the customization associating potential callers with a given audio file.

Preferably, a potential caller's telephone number is used to identify the caller, and caller identification information is used at the telephone to identify the originator of the incoming call. The telephone number may be a traditional circuit-switched telephone number or a packet-switched telephone number, which may include an email address, IP address, or the like used to identify an originating telephony device. Those skilled in the art will recognize the application of the present invention to packet- and circuit-switched communications.

The audio files used to provide the ring signals may be initially stored on the telephone 22, 30, 32, or telephone server 26; downloaded from the application server 20, computer 18, or separate file database 34 over the packet-switched network 12; stored directly on the telephone using portable memory, such as flash memory or a floppy disk; or downloaded through an auxiliary interface using optical or radio frequency communications. The manner in which the audio files are made available to the telephones 22, 30, 32 or telephone server 26 are numerous, and those skilled in the art will recognize alternative configurations to provide audio files to these devices.

Figure 2:
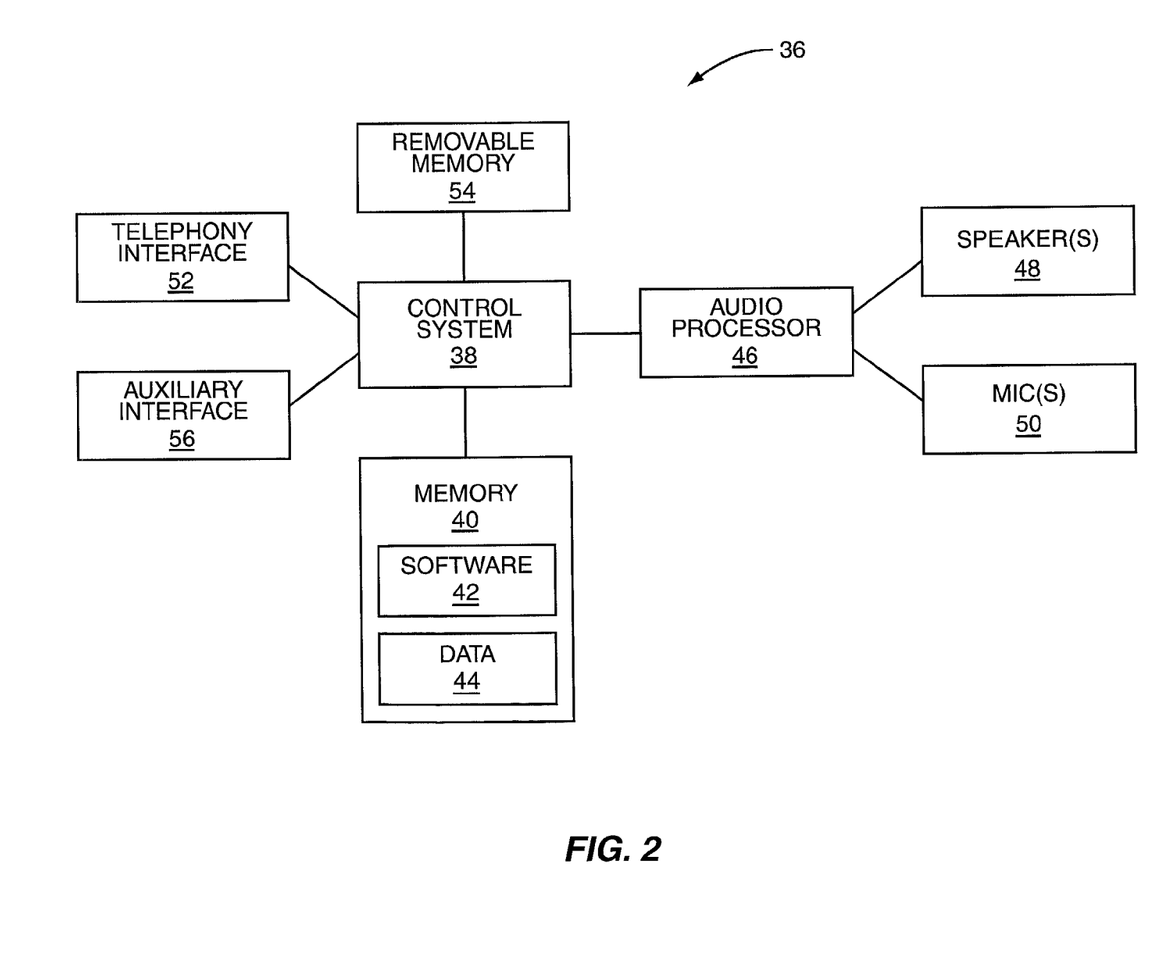
FIG. 2 depicts an exemplary telephony architecture according to the present invention.

As shown in FIG. 2, the telephones 22, 24, 30, 32 will typically include a basic telephony architecture 36. The telephony architecture 36 will preferably include a control system 38 associated with memory 40 having the requisite software 42 and associated data 44 for operation of the device. The data 44 may include the audio files as well as configuration information to facilitate ring customization.

The telephony architecture 36 will also include an audio processor 46 capable of providing support for one or more speakers 48 and microphones 50. The audio processor 46 will typically facilitate any analog-to-digital or digital-to-analog conversions necessary for telephony operation. For example, in packet-switched applications, the audio processor 46 will convert incoming digital signals to corresponding analog signals for playback at the speaker 48. Analog signals from the microphone 50 will be converted to digital signals for transmission across the packet-switched network 12. Further, in circuit-switched or packet-switched applications, audio files are preferably stored in a digital format and will require digital-to-analog conversion for playback at the speaker 48.

The audio processor 46 may provide any necessary decompression of the digital audio. Those skilled in the art will also recognize that the control system 38 may be configured to provide the function of the audio processor 46 wherein the control system 38 and audio processor 46 are integrated.

The telephony architecture 36 will also include a telephony interface 52 to facilitate telephony communications for calls. Depending on the configuration of the telephony architecture 36, the telephony interface 52 may also facilitate downloads of configuration information as well as audio files. The telephony interface 52 may be a packet-switched interface or a circuit-switched interface depending on the telephone configuration. Further, the telephony architecture 36 may support removable memory 54 as well as an auxiliary interface 56. The removable memory 54 may be a flash memory card, compact disk (CD), digital versatile disk (DVD), floppy disk, or the like requiring a corresponding interface or drive.

The auxiliary interface 56 may be configured to support electrical, radio frequency, or optical communications to download audio files or configuration information. As such, the telephony architecture 36 may interface with a serial cradle, universal serial bus (USB) cradle, infrared device, wireless modem, or the like. The audio files may use various types of compression techniques in order to minimize the impact on memory. Regardless of whether the audio files are provided via the telephony interface 52, the removable memory 54, or the auxiliary interface 56, the audio files are preferably stored in the memory 40 as data 44 for operation.

Although the audio files may take on any form, the audio files are preferably provided in an MP3 or Microsoft WAVE file (.wav). The audio files may include any audible information, which will range from simple announcements or names to unique noises or jingles.

Figure 3:
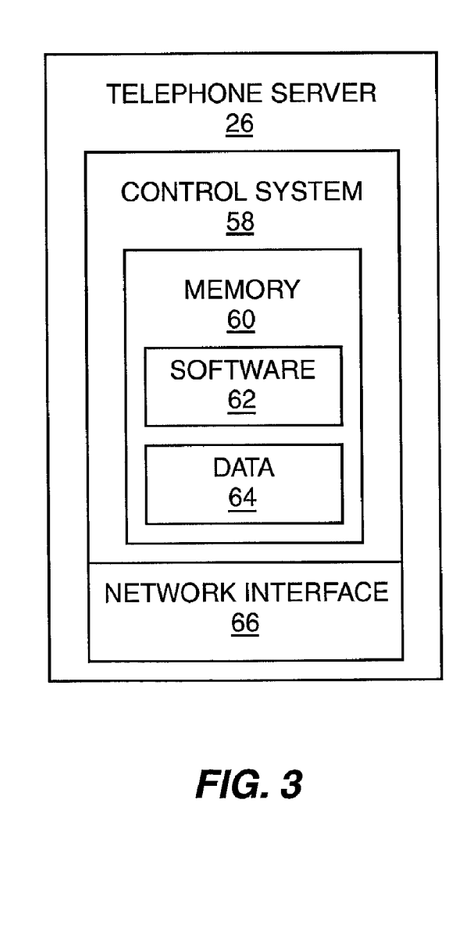
FIG. 3 is a block representation of a preferred configuration of a telephone server according to the present invention.

As shown in FIG. 3, a client-server telephone application, such as the telephone server 26 within server system 28, will include a control system 58 having memory 60 with associated software 62 and data 64. The software 62 provides the necessary programming or instructions to facilitate operation of the telephone server 26. In essence, the control system 58 is configured to control the operation and communication of the associated telephone terminals 24 via a network interface 66. As such, recognition of the originators of incoming calls and associated audio files for the corresponding ring signals are controlled by the telephone server 26 instead of being handled at the telephone terminals 24. An analogous circuit-switched solution may be provided by private branch exchanges (PBXs) or the like in commercial environments. Typically, the PBX will control operation of telephone terminals. Although the remainder of the description will focus on the operation of the application server 20 and telephone devices 22, 30, and 32, the combined operation of the telephone terminals 24 and the telephone server 26 will be considered a single entity for the purposes of the description.

Figure 4:
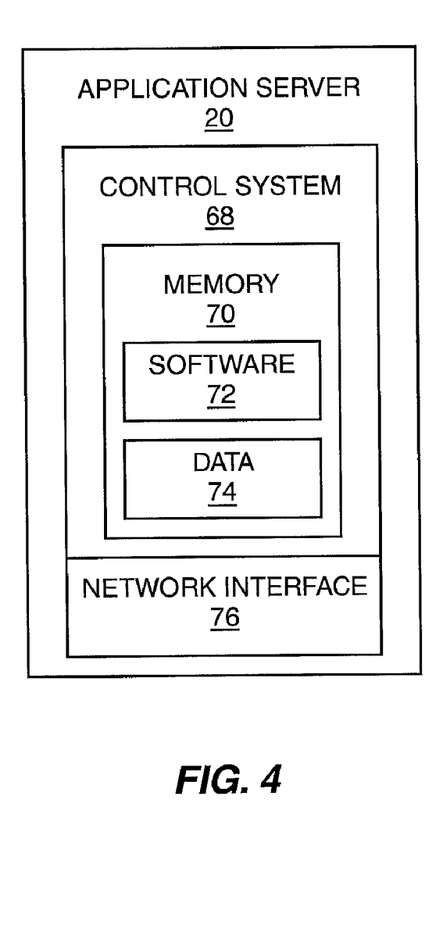
FIG. 4 is a block representation of a preferred configuration of an application server according to the present invention.

As shown in FIG. 4, the application server 20 will preferably include a control system 68 associated with memory 70 having the requisite software 72 and associated data 74 for operation of the device. The application server 20 will communicate over the packet-switched network 12 in traditional fashion via a network interface 76. Preferably, the application server 20 is configured as a traditional web server accessible by a subscriber through an appropriate browser.

Figure 5:
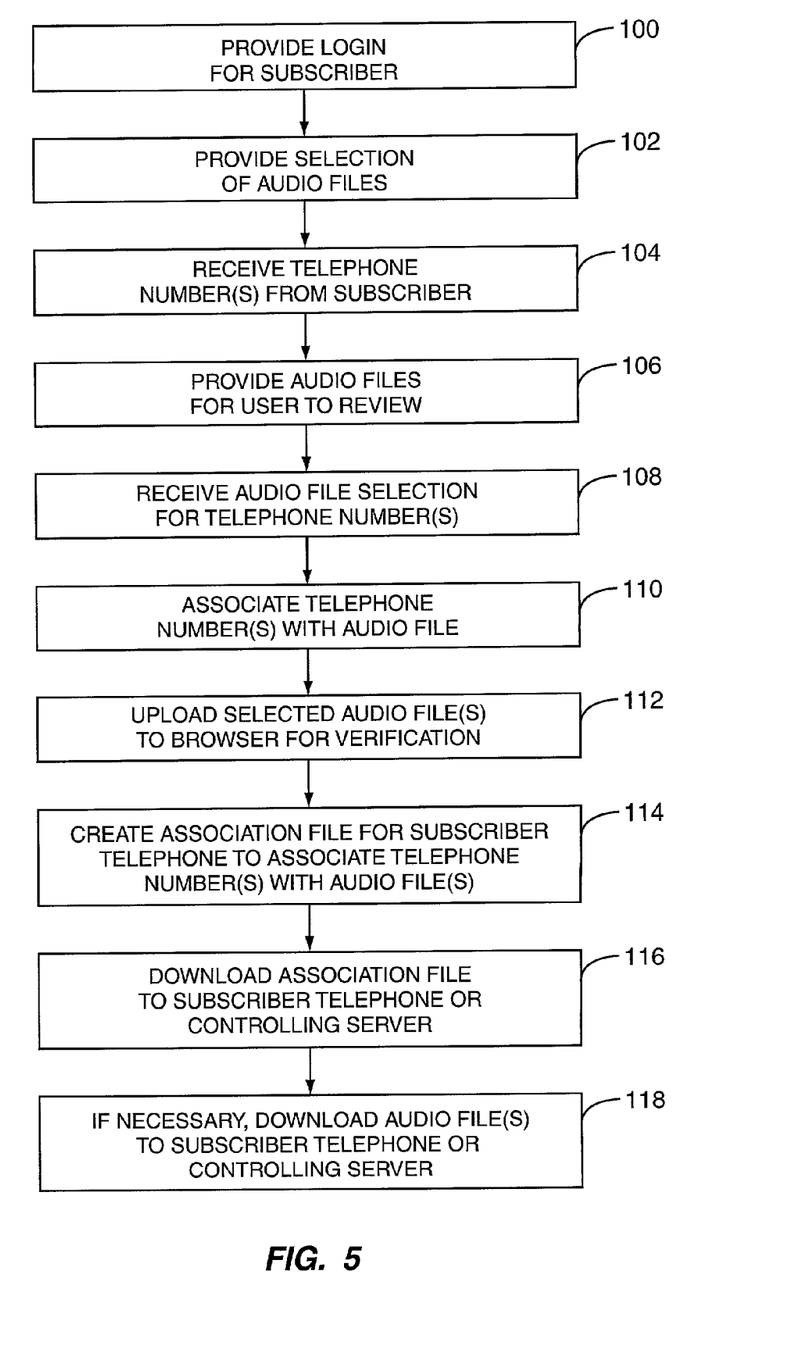
FIG. 5 is a flow diagram outlining the basic flow for configuring and associating audio files with selected telephone numbers according to a preferred embodiment of the present invention.

In operation, a subscriber at computer 18 may use a browser to access the application server 20. FIG. 5 represents the basic operational flow of the application server 20 upon being accessed by a browser running on computer 18. Preferably, the application server 20 will require the subscriber to provide login information (block 100) to initiate the session. After login, the application server 20 will provide a selection of audio files for the subscriber to view (block 102) and the subscriber will provide one or more telephone numbers corresponding to people or businesses expected to call the subscriber.

The application server 20 will receive the telephone numbers from the subscriber (block 104), and provide chosen audio files for the user to review via the browser (block 106). The subscriber will next select an audio file for each telephone number, and the application server 20 will receive the audio file selections (block 108) and associate each telephone number with the selected audio file (block 110). Preferably, the application server 20 will provide a web page in which the subscriber will enter the telephone numbers for the expected callers and selected audio files to provide a customization profile for the subscriber. The customization profile may be associated with one or more of the subscriber's telephones. As such, the subscriber may choose to have different customization profiles for different telephones. An exemplary customization profile is provided in Table A below.

TABLE A

| Telephone Number | Associated Filename | Associate | Listen | Download To |
| --- | --- | --- | --- | --- |
| 555-1234 | phil.wav | Phil Green | click here | cellular |
| 555-4321 | john.wav | John Smith | click here | home |
| 555-0987 | erik.wav | Erik Redding | click here | cellular and home |
| 555-0123 | none | Dan Stanley | | |

Regardless of the number of subscriber telephones, the application server 20 will preferably upload the selected audio files to the browser to allow the subscriber to verify the audio file selection for the one or more telephone numbers (block 112). Next, the application server 20 will create an association file containing the customization profile that associates the telephone numbers and the audio files (block 114), and will download the association file to the one or more subscriber telephones (block 116). In the case of a client-server telephone application, such as that for packet-switched telephone server system 28 (or a PBX controlling telephone terminals), the association file may be downloaded to the telephony server 26 (or PBX) (block 116).

The audio files associated with the customization profile will need to be downloaded to the subscriber's telephone if the audio file does not already exist at the subscriber's telephone (block 118). Preferably, the application server 20 can access the subscriber telephone to identify the audio files resident on the telephone or readily available to the telephone. Thus, the association file downloaded to the subscriber telephone may or may not include audio files. Further, if multiple audio files are associated with multiple potential callers, only the files that were not resident on the subscriber's telephone will be downloaded.

As noted above, the subscriber's telephone may be configured to receive audio files from a direct download from the computer 18, the application server 20, or the file database 34 over the packet-switched network 12 and, if applicable, the PSTN 14 and/or wireless network 16. Further, audio files may be provided to the subscriber's telephone using the removable memory 54 or via the auxiliary interface 56. Those skilled in the art will recognize numerous options for providing audio files to the subscriber's telephone.

Once the audio files and association file have been provided to the subscriber's telephone(s), each telephone is ready to provide customized ring signals for incoming calls associated with callers identified in the association file. An exemplary process outlining the operation of the subscriber's telephone is provided in FIG. 6. Initially, the telephone will process an incoming call (block 200) and identify the caller's telephone number (block 202). Notably, the telephone number may be a traditional circuit-switched telephone number or a packet-switched based telephone number, which may include an IP address, email address, or the like.

Figure 6:
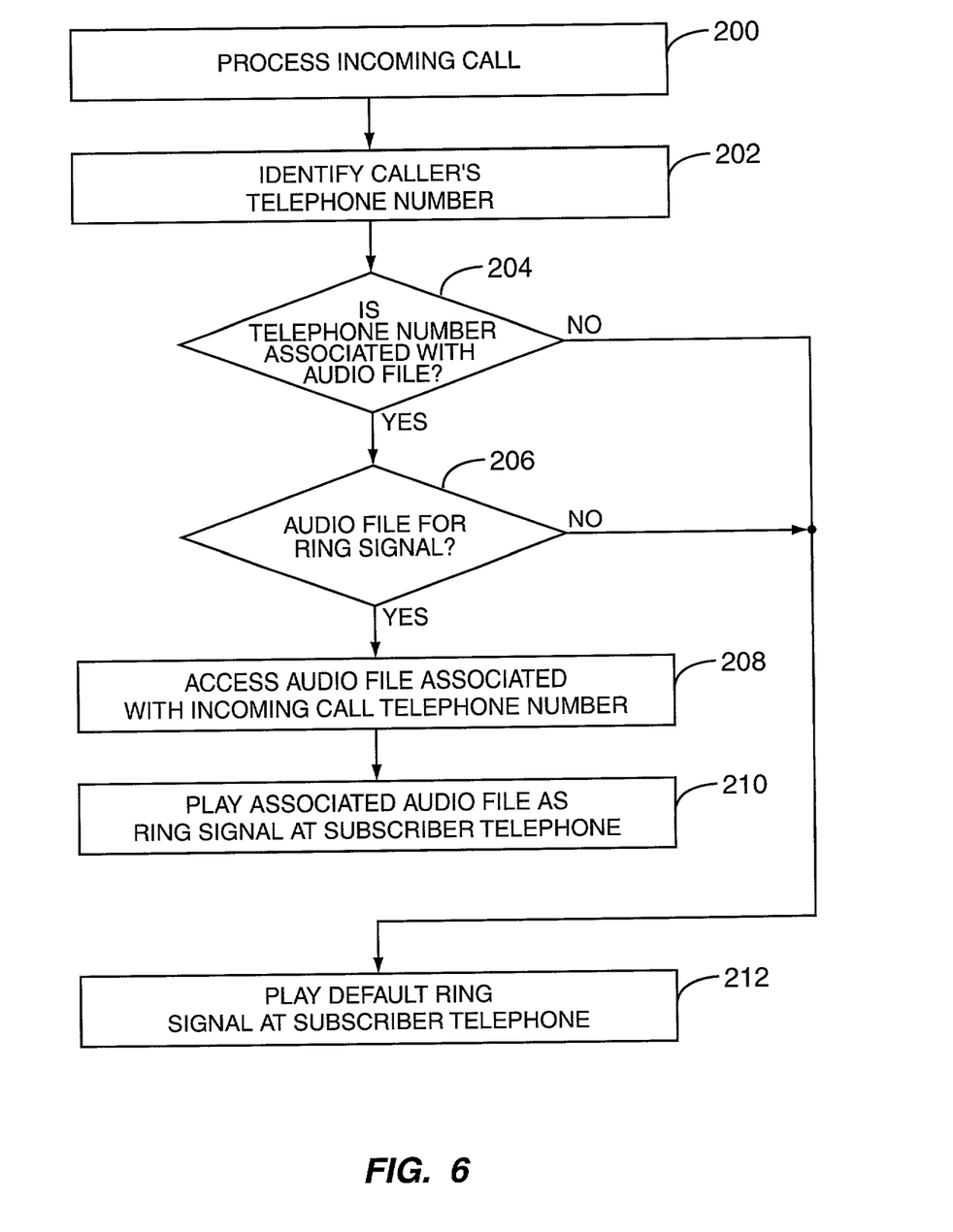
FIG. 6 is a flow diagram outlining the basic flow for processing incoming telephony calls according to a preferred embodiment of the present invention.

The telephone will next determine if the telephone number of the caller is listed in the customization profile and associated with an audio file (block 204). If the caller's telephone number is not associated with an audio file, the telephone will play the default ring signal (block 212). If the caller's telephone number appears in the customization profile, and the audio file is available (block 206), the telephone will access the audio file associated with the caller's telephone number (block 208). The telephone will then execute and play the associated audio file as the ring signal for the subscriber's telephone (block 210). If the audio file is not available (block 206), the telephone will play the default ring signal (block 212).

Those skilled in the art will recognize the tremendous utility and flexibility provided by the present invention as well as the ease of customization using the web interface. The invention eliminates the need to view displays to ascertain the identity of a calling party. With regard to mobile telephones, this feature not only enhances user convenience, but provides a safety feature. As noted, the web interface may support customization for any number of telephones for any given subscriber. Further, the number of unique ring signals and profiled callers is limited only by the configuration and memory available to the subscriber's telephone. Service providers will be able to generate revenues by providing the services associated with the invention to their subscribers. Notably, the present invention may be implemented on any number of network devices, servers, and telephones along with software carrying program instructions on computer readable media. Any such implementation or method of carrying out the invention is considered within the scope of the description and the claims that follow.

Those skilled in the art will recognize improvements and modifications to the disclosed embodiments of the present invention. All such improvements and modifications are considered within the scope of the concepts disclosed herein and the claims that follow.

What is claimed is:

1. A method to provide for caller identification using telephony ring signals comprising:
   a) receiving, at an application server in a communications network, a telephone number of an expected caller;
   b) receiving identification of an audio file to play as the telephony ring signal at a telephony device for an incoming call originating from the expected caller;
   c) creating indicia associating the telephone number of the expected caller with the audio file; and
   d) sending the indicia associating the telephone number of the expected caller with the audio file from the application server to the telephony device,
      wherein the telephony device will play the audio file as the telephony ring signal upon receiving the incoming call from the expected caller independently of whether the telephony device for the incoming call is involved in an ongoing call, and;
      wherein the indicia associating the telephone number of the expected caller with the audio file includes a location of the audio file.

2. The method of claim 1, further comprising sending the audio file to the telephony device.

3. The method of claim 2 further comprising encoding the audio file using a compression algorithm prior to sending the audio file to the telephony device.

4. The method of claim 1 further comprising:
   a) receiving a second telephone number of a second expected caller; and
   b) receiving identification of a second audio file to play as the telephony ring signal for an incoming call originating from the second expected caller,
   wherein the creating step further creates the indicia to associate the second telephone number of the second expected caller with the second audio file.

5. The method of claim 1 wherein the indicia associating the telephone number of the expected caller with the audio file comprises a file readable by the telephony device.

6. The method of claim 1 further comprising generating a profile associating a unique audio file with each of a plurality of telephone numbers of additional expected callers for the telephony device.

7. The method of claim 1 wherein the telephone number is one of the group consisting of an IP address, email address, packet-switched device telephony identifier, and traditional circuit-switched telephone number.

8. A method to provide for caller identification using telephony ring signals comprising:
   a) receiving, at an application server in a communications network, a telephone number of an expected caller;
   b) receiving identification of an audio file to play as the telephony ring signal at a telephony device for an incoming call originating from the expected caller;
   c) creating indicia associating the telephone number of the expected caller with the audio file; and
   d) sending the indicia associating the telephone number of the expected caller with the audio file from the application server to the telephony device,
      wherein the telephony device will play the audio file as the telephony ring signal upon receiving the incoming call from the expected caller independently of whether the telephony device for the incoming call is involved in an ongoing call; and
      providing a web interface accessible by a web browser wherein the telephone number of the expected caller and the identification of the audio file are received at the application server via the web interface using the web browser.

9. A method to provide for caller identification using telephony ring signals comprising:
   a) identifying, at an application server within a communications network, a telephone number for an originator of an incoming call;
   b) selecting an audio file based on the telephone number;
   c) effecting playback of the audio file as the telephony ring signal for the incoming call independently of whether the telephony device for the incoming call is involved in an ongoing call
   d) determining, at the application server, if the telephone number is associated with the audio file within a plurality of available audio files; and
   e) if the telephone number is not associated with the audio file within the plurality of available audio files, effecting a default ring signal.

10. The method of claim 9 further comprising providing the plurality of available audio files including the audio file and wherein the selecting step includes selecting the audio file from the plurality of available audio files.

11. The method of claim 9 further comprising receiving and storing indicia associating the audio file with the telephone number.

12. The method of claim 9 further comprising receiving and storing the audio file.

13. The method of claim 9 further comprising receiving and storing a profile associating the plurality of available audio files with a plurality of expected telephone numbers for originators of expected incoming calls, the profile identifying the audio file and the telephone number for the originator of the incoming call wherein the selecting step selects the audio file based on the telephone number in the profile.

14. The method of claim 9 wherein the identifying step identifies the telephone number for the originator of the incoming call using caller identification information received during initial reception of the incoming call.

* * * * *